US009780346B2

(12) United States Patent
Partes et al.

(10) Patent No.: US 9,780,346 B2
(45) Date of Patent: Oct. 3, 2017

(54) METHOD AND DEVICE FOR INCREASING SAFETY WHEN USING BATTERY SYSTEMS AND BURSTING DISCS

(71) Applicant: Robert Bosch GmbH, Stuttgart (DE)

(72) Inventors: Hans Partes, Asperg (DE); Markus Hald, Jagstzell (DE); Holger Fink, Stuttgart (DE); Joachim Fetzer, Bad-Ditzenbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 380 days.

(21) Appl. No.: 14/291,091

(22) Filed: May 30, 2014

(65) Prior Publication Data

US 2014/0356653 A1 Dec. 4, 2014

(30) Foreign Application Priority Data

May 31, 2013 (DE) .......................... 10 2013 210 151

(51) Int. Cl.
*H01M 2/12* (2006.01)
*F16K 17/16* (2006.01)
*H01M 10/48* (2006.01)

(52) U.S. Cl.
CPC ....... *H01M 2/1241* (2013.01); *F16K 17/1606* (2013.01); *H01M 10/48* (2013.01)

(58) Field of Classification Search
USPC ...................................... 429/50, 56
See application file for complete search history.

(56) References Cited

U.S. PATENT DOCUMENTS

| 4,280,126 A | * | 7/1981 | White | G01F 23/2965 340/621 |
|---|---|---|---|---|
| 5,660,944 A | * | 8/1997 | Sprengel | H01M 2/12 429/90 |
| 2007/0283772 A1 | | 12/2007 | Brazier et al. | |

FOREIGN PATENT DOCUMENTS

| DE | 6751613 | 2/1969 | | |
|---|---|---|---|---|
| DE | 102012203444 | 9/2013 | | |
| DE | WO 2013/131715 A1 | * | 9/2013 | ............ H01M 10/48 |

* cited by examiner

*Primary Examiner* — Osei Amponsah
(74) *Attorney, Agent, or Firm* — Michael Best & Friedrich LLP

(57) ABSTRACT

Method for increasing safety when using bursting discs (BV), wherein the bursting disc (BV) is suitable for releasing gas in a controlled manner from battery systems (B), wherein a signal, in particular a warning signal, is generated in dependence upon the spatial change at least of one site on the surface of the bursting disc (BV).

15 Claims, 1 Drawing Sheet

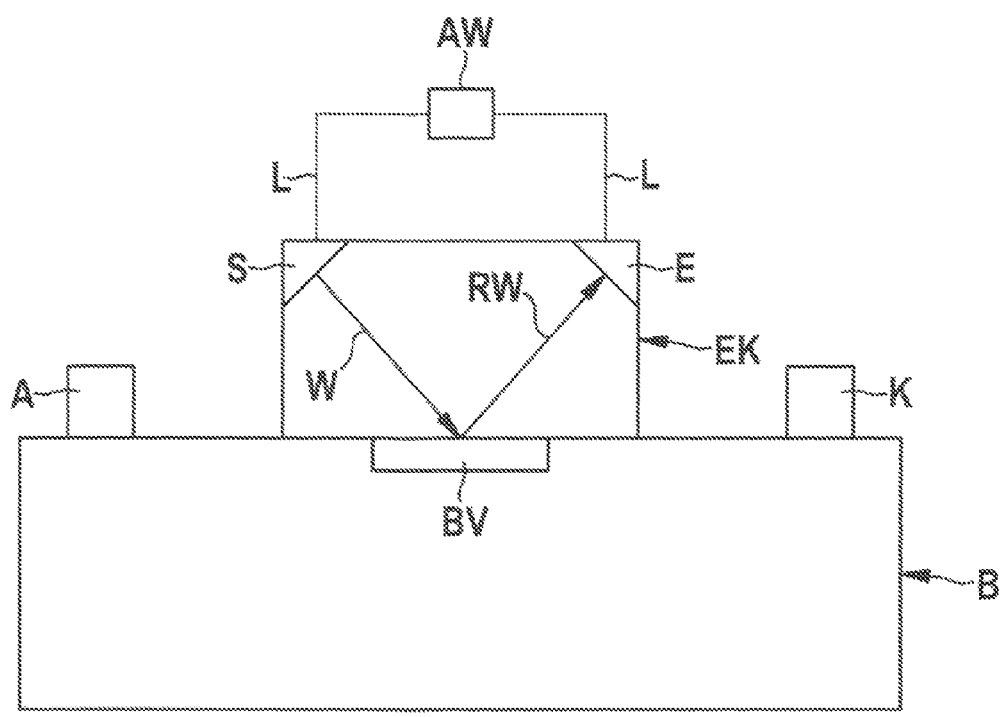

METHOD AND DEVICE FOR INCREASING SAFETY WHEN USING BATTERY SYSTEMS AND BURSTING DISCS

BACKGROUND OF THE INVENTION

The present invention relates to a method and a device for increasing safety when using battery systems and bursting discs.

Methods and devices when using battery systems and bursting discs are known from the prior art. The bursting discs are used to release gas in a controlled manner from battery systems in which gas has been produced in an uncontrolled manner. Devices for increasing the safety of bursting discs are in particular electrical systems.

Thus, DE 60208563T2 discloses a method for monitoring pressure reducing devices, by way of example bursting discs, wherein it is possible by means of an electrical current circuit in immediate proximity to the pressure reducing device to determine the deformation or bursting of the pressure reducing device with reference to a change in an electrical signal that is transmitted by way of the electrical current circuit.

SUMMARY OF THE INVENTION

The invention relates to a method for increasing safety when using bursting discs, wherein the bursting disc is suitable for releasing gas in a controlled manner from battery systems.

The core of the invention resides in the fact that a signal, in particular a warning signal, is produced in dependence upon spatial changes at least in one site on the surface of the bursting disc.

The circumstance of generating a signal, in particular a warning signal, in dependence upon the spatial change at least of one site on the surface of the bursting disc leads to the advantage that the pressure inside the battery system can be determined with reference to the spatial change of the at least one site on the surface of the bursting disc. Moreover, it is possible even prior to the bursting disc bursting to emit a warning signal to persons who are located in the vicinity of the battery system. By virtue of emitting a warning signal in good time and prior to the bursting disc bursting, the safety of persons in the vicinity of a damaged battery system is increased.

The background of the invention is that when gas is produced inside a battery system this leads to an increase in the pressure inside the battery system. This pressure causes the bursting disc to deform in a plastic manner. Once the bursting disc has deformed in a plastic manner in excess of a particular amount, said bursting disc opens and the gases that have been produced are then discharged.

In addition, the invention provides a battery system, in particular a lithium ion battery system, having a device for increasing the safety when using bursting discs, wherein the bursting disc is suitable for releasing gas in a controlled manner from battery systems. The device renders it possible to determine the spatial change at least of one site on the surface of the bursting disc.

According to a further advantageous embodiment of the invention, the spatial change of the at least one site on the surface of the bursting disc is determined using a transit time technique.

A transit time technique is a method, wherein a signal is emitted by a transmitter and the signal is reflected by another point in the space. Finally, the signal is received by a receiver. It is possible by way of the correlation of measured period of time—that the signal requires overall to pass from the transmitter to the receiver—and the known rate of travel of the signal to calculate the distance covered by the signal.

The other point in the space is in accordance with the invention at least one site on the surface of the bursting disc. Any gas that has possibly been produced and consequently an associated increase in the pressure inside a battery system causes a spatial change at least of one site on the surface of the bursting disc, the reason being that the surface of the bursting disc becomes outwardly distorted as a result of the pressure that is produced inside the battery system. Since the distance between at least one site on the surface of the bursting disc and the transmitter and receiver changes as a result of the change of the at least one site on the surface of the bursting disc relative to the transmitter and receiver, the distance covered by the signal also changes. Finally, the change in the distance covered by the signal causes the measured period of time during which the signal travels to change.

By virtue of using a transit time method to determine the change of the at least one site on the surface of the bursting disc, the advantage is provided that it is possible to determine precisely even very small spatial changes of the at least one site on the surface of the bursting disc and as a consequence even very small surface distortions of the bursting disc. By way of example, it is possible to determine surface distortions that lead to a change in the site on the surface of the bursting disc of 1 μm to 100 mm. It is possible by determining a small surface distortion in the bursting disc to detect in good time in particular processes of a continuous production of gas. It is possible to generate a corresponding signal, in particular a warning signal, on the basis of determining the spatial change of at least one site on the surface of the bursting disc. Moreover, where applicable, corresponding measures can be introduced to prevent any further production of gas.

In accordance with a further advantageous embodiment of the invention, a wave that propagates in a transverse manner, in particular an electromagnetic wave, or a wave that propagates in a longitudinal manner, in particular a mechanical wave, in particular an ultrasonic wave, is used in order to perform the transit time method.

According to a further advantageous embodiment of the invention, at least one piezoelectric element is used as a transmitter and/or receiver of the ultrasonic wave in order to measure the transit time of the ultrasonic wave.

By virtue of using a piezoelectric element as the transmitter and/or as the receiver of the ultrasonic wave, the advantage is produced that it is possible using a piezoelectric element to measure small periods of transit time; the periods of transit time can amount by way of example to 100 microseconds up to 1000 microseconds. This leads to the advantage that it is possible to establish even small changes in the distance between the transmitter and the at least one site on the surface of the bursting disc and consequently even small changes in the outer curvature of the bursting disc. Exemplary changes in the distance between the transmitter and the at least one site on the surface of the bursting disc can amount to between 1 μm up to 100 mm.

In accordance with a further embodiment of the invention, the measured transit time is compared with a threshold value and a warning signal is generated if said transit time achieves or is less than the threshold value. The threshold value depends inter alia on the bursting disc and the material characteristics and the geometrical dimensions of the bursting disc itself. The material characteristics and the geometrical dimensions of the bursting disc determine the behavior of the bursting disc as its surface distorts and also determine how the bursting disc opens.

In accordance with a further preferred embodiment of the invention, the change in the rate of propagation of the waves is determined and taken into consideration in dependence upon the temperature of the medium through which the waves are propagated, said medium regularly being air. The accuracy of the measurement of the transit time can be increased by virtue of determining and taking into consideration the change in the propagation rate of the waves in dependence upon the temperature of the air. In order to determine the temperature of the air, it is possible to use where applicable already existing temperature sensors.

According to a further preferred embodiment of the invention, the device of the battery system comprises at least one piezoelectric element in order to perform the transit time method.

According to a further advantageous embodiment of the invention, the device for determining the transit time is embodied from two piezoelectric elements, in particular two piezoelectric film elements. One piezoelectric element is embodied as a transmitter of a wave and another piezoelectric element is embodied as a receiver of a wave.

By virtue of embodying the piezoelectric elements as piezoelectric film elements, the advantage is provided that it is possible to use continuously the device for determining the transit time. As a consequence, there is no dead time and as a consequence no necessary minimum distances from the transmitter and the receiver to the surface of the bursting disc that are otherwise necessary when using an individual film element as the transmitter and receiver.

In accordance with a further advantageous embodiment of the invention, the device for determining the transit time can be provided at a short distance from the bursting disc of the battery system or in the region of a gas discharge duct of the battery system. The short distance can be by way of example a distance between 2 cm and 20 cm. By virtue of providing the device for determining the transit time in the region of the gas discharge duct of the battery system, it is possible to provide the device for determining the transit time in particular inside the gas discharge duct in such a manner that signals can be transmitted directly by the transmitter to a site on the surface of the bursting disc and said signals can be reflected from said site to the receiver.

BRIEF DESCRIPTION OF THE DRAWINGS

The invention is described hereinunder with reference to an exemplary embodiment which can give rise to further inventive features and the invention is not limited in its scope to said further inventive features. The exemplary embodiment is illustrated in the drawing, in which:

FIG. 1 illustrates a schematic illustration of a battery system in accordance with the invention with a device for determining the spatial change at least of one site on the surface of a bursting disc.

DETAILED DESCRIPTION

FIG. 1 illustrates a schematic illustration of a battery system B having a device in accordance with the invention for determining the change at least of one site on the surface of a bursting disc BV. The bursting disc BV is used to release gas in a controlled manner from a battery system B.

An anode is designated by the reference letter A and a cathode of the battery system B is designated by a reference letter K. A gas discharge duct of the battery system B is designated by the reference letters EK; for the case that gases exit through the bursting disc BV, these gases can be discharged in a controlled manner by way of the gas discharge duct EK and directed away from the battery system B.

According to the described exemplary embodiment, the device for determining the change at least of one site on the surface of the bursting disc BV comprises four components; a transmitter is designated by the reference letter S; the transmitter is used to transmit a wave W. The wave W can be a transverse, in particular electromagnetic, wave or a longitudinal, in particular mechanical, wave. In particular, ultrasonic waves are provided in accordance with the invention. The wave W impinges on a site [not illustrated] on the surface of the bursting disc BV and same wave is reflected from said site. The reflected wave RW is received by a receiver that is designated by the reference letter E.

The reference letter L designates lines that transmit information from the transmitter S and the receiver E to an evaluating unit that is designated by the reference letters AW. Said information is in particular a point in time t1 at which the wave W is transmitted by the transmitter S, and a point in time t2 is the time at which the reflected wave RW is received by the receiver E. It is possible using the evaluating unit AW and with reference to the difference between the two points in time t1 and t2 to determine the period of time required by the wave W to arrive at least at one site on the surface of the bursting disc BV and from there to be received in the form of a reflected wave RW by the receiver E.

When the rate of propagation of W and RW is known, it is consequently possible to determine the distance covered by W and RW.

In order to take into consideration temperature-dependent changes in the rate of propagation of the waves W and RW, it is possible in particular to use the information relating to the temperature of the medium through which the waves W and RW propagate; said medium regularly being air. Temperature sensors that are not illustrated and that are where applicable already provided can be used for determining the temperature of said medium.

In order to determine whether any gas has been produced inside the battery system B, the following procedure is performed: waves W are transmitted by the transmitter S to the surface of the bursting disc BV from where said waves are reflected and in the form of the wave RW received by the receiver E, and the waves RW move from the site on the reflection towards said receiver. The time intervals during which the waves W are transmitted by the transmitter S are by way of example 10 microseconds up to 1000 microseconds. The periods of time that the waves W and RW require in order to pass from the transmitter S to the receiver E are determined by means of the evaluating unit AW and compared with a threshold value. It is possible to generate a warning signal for the case that at least one period of time achieves or is less than the threshold value. Moreover, method steps can be introduced that are used to prevent damage to the battery system B.

What is claimed is:

1. A battery system (B) having a device for increasing safety when using bursting discs (BV) suitable for releasing gas in a controlled manner from battery systems (B), wherein the device is configured to determine a spatial change at least of one site on a surface of a bursting disc (BV) using a transit time method, wherein the device comprises a transmitter (S) for transmitting waves, a receiver (E) for receiving waves, and an evaluating unit (AW), wherein a wave (W) transmitted by the transmitter (S) impinges on the site of the surface of the bursting disc (BV) and is reflected from the site in the form of a reflected wave (RW), and wherein the evaluating unit (AW) determines a period of time required for the reflected wave (RW) to be received by the receiver (E), wherein the device comprises at least one piezoelectric element (S, E) for performing the transit time method.

2. The battery system (B) according to claim 1, characterized in that the device comprises two piezoelectric elements (S, E), wherein one piezoelectric element is the transmitter (S) and another piezoelectric element (S, E) is the receiver (E).

3. The battery system (B) according to claim 1, characterized in that the device is provided at a short distance from the bursting disc (BV) of the battery system (B).

4. The battery system (B) according to claim 1, wherein the battery system is a lithium ion battery system.

5. The battery system (B) according to claim 1, characterized in that the device is provided in a region of a gas discharge duct (EK) of the battery system (B).

6. The battery system (B) according to claim 5, characterized in that the device is provided at a short distance from the bursting disc (BV).

7. The battery system (B) according to claim 1, characterized in that the device is configured to use an ultrasonic wave to perform the transit time method.

8. The battery system (B) according to claim 7, characterized in that the device is configured to use the at least one piezoelectric element as at least one of the transmitter (S) and the receiver (E) of the ultrasonic wave for measuring the transit time of the ultrasonic wave.

9. The battery system (B) according to claim 7, characterized in that the device is configured to determine a change in the rate of propagation of waves (W, RW) and to take into consideration the change in the rate of propagation in dependence upon the temperature of the air.

10. The battery system (B) as claimed in claim 1, characterized in that the device is configured to compare the transit time with a threshold value and to generate a warning signal if said transit time achieves or is below the threshold value.

11. The device according to claim 1, wherein the device is configured to generate a warning signal in dependence upon the spatial change.

12. The device according to claim 1, characterized in that one of a wave that propagates in a transverse manner and a wave that propagates in a longitudinal manner is used to perform the transit time method.

13. The battery system (B) according to claim 12, characterized in that the device is configured to determine a change in the rate of propagation of waves (W, RW) and to take into consideration the change in the rate of propagation in dependence upon the temperature of the air.

14. The battery system (B) according to claim 1, wherein the battery system further comprises an anode, a cathode and a gas discharge duct, and wherein the device is located in a region of the gas discharge duct.

15. The battery system (B) according to claim 1, wherein the transmitter (S) is positioned such that the angle of incidence of the wave (W) is approximately 45 degrees.

* * * * *